United States Patent Office 3,077,190
Patented Feb. 12, 1963

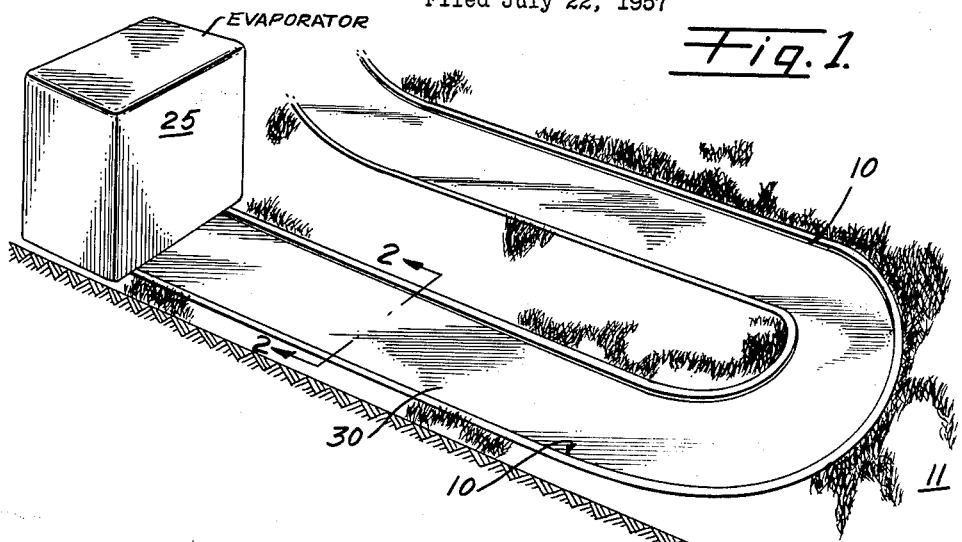
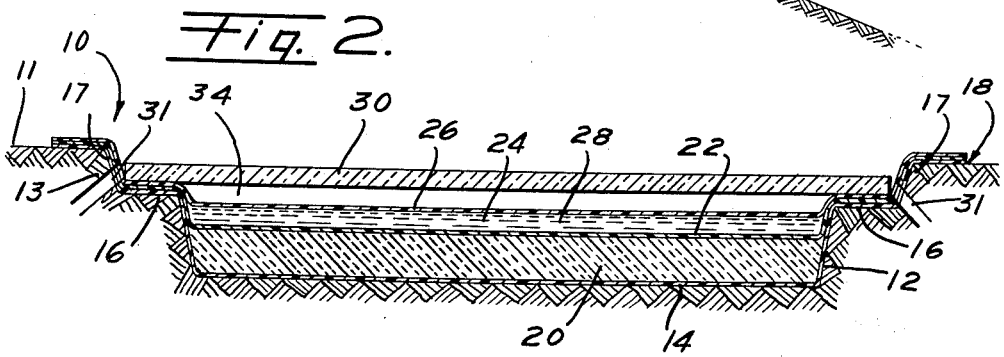
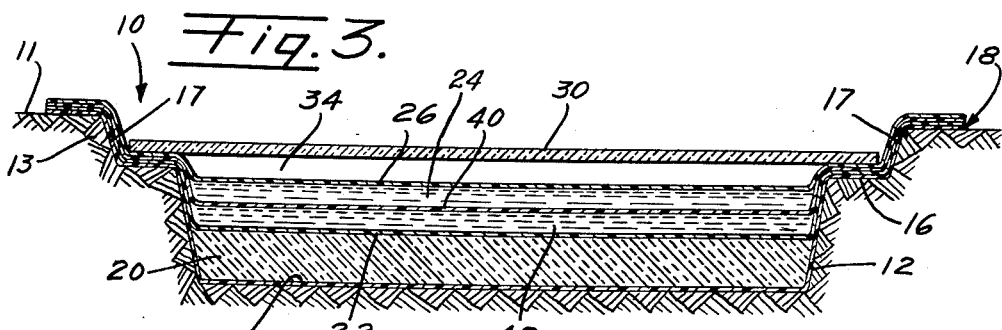

3,077,190
SOLAR WATER HEATING APPARATUS
Philip S. Allen, Carlsbad, Calif.; Naomi B. Allen, executrix of Philip S. Allen, deceased
Filed July 22, 1957, Ser. No. 673,358
15 Claims. (Cl. 126—271)

My invention relates to improvements in hot water heaters in which energy from the rays of the sun is utilized for heating the water.

While my invention has particular utility in the mass heating of water and is shown and described in such connection, its utility is not necessarily confined thereto.

One use to which my present invention is particularly applicable is in the heating of sea or brackish water prior to evaporation and condensation for converting it into fresh water.

It is an object of my invention to provide apparatus for the cheap mass heating of water from the rays of the sun.

Another object of my invention is to provide apparatus of this character by which the water may be very rapidly heated from the rays of the sun thus resulting in a high degree of efficiency.

A further object of my invention is to provide an improved means and method of heating water by solar energy while minimizing heat losses from convection air currents, or the like, above the water undergoing heating.

A still further object of my invention is to provide apparatus of this character wherein sea water to be heated, vaporized and condensed, is preheated by heat exchange with sea water previously heated and processed to partially heat the cold water entering the apparatus by waste heat present in the water discharging from the apparatus.

Another object of my invention is to provide apparatus of this character having an upper surface that may be easily cleaned by the use of water, and having means by which water will rapidly drain therefrom.

A further object of my invention is to provide a buoyantly supported cover for solar water heaters in general and more particularly for use in the mass heating of sea water undergoing conversion into fresh water.

The characteristics and advantages of my invention are further sufficiently referred to in connection with the following description of the accompanying drawings which illustrate various embodiments of my invention. After considering these examples, skilled persons will understand that variations may be made without departing from the principle disclosed, and any structures, arrangements or modes of operation that are properly within the scope of the accompanying claims are contemplated.

In the accompanying drawings:

FIG. 1 is a perspective view of apparatus embodying my present invention.

FIG. 2 is a sectional view taken on line 2—2 of FIG. 1.

FIG. 3 is a similar sectional view of an alternative arrangement.

The invention includes what may be termed a basin and in FIGS. 1 and 2, this basin is shown as a channel 10 provided in a substantially level tract of land, indicated generally at 11. The channel 10 is relatively shallow and includes a lower part 12 with a substantially level bottom and a widened upper part 13.

A water-tight film 14 of suitable material is disposed on the bottom of the channel 10 with the side portions resting on the sides of the channel, level shoulders 16 between the top edges of the lower part 12 and the bottom edges of the upper widened portion 13, and outwardly over the sides 17 of the widened portions 13, and over the adjacent edge portions of the ground surface, as indicated at 18. The material of the film may be of any suitable character, although flexible plastic of any well-known type is preferred.

In the bottom of the channel 10 and over the plastic film 14 there is laid a relatively thick sheet 20 of heat insulating material of any suitable character such as, for example, glass wool. This sheet 20 prevents the heat from passing down into the earth and lost to use. Over the sheet 20 there is laid a film 22 of sheet plastic, or the like, and this film also has side edge portions which extend along the upper side portions of the channel 10 and terminate along the edges of the part 18.

The film 22 serves as the bottom wall of a passage 24 through which the water 28 to be heated is circulated. The top of the passage 24 is formed by a film or sheet 26 of plastic which also has its side portions extending outwardly to the edges of the part 18. The sheet of plastic 26 is colored as nearly a flat black as possible so that it will absorb a maximum of heat from the sun and thereby heat the body of water 28 disposed in the passage 24. It will be understood that the sheet 26 may be of some other dark and non-glossy color, but black is preferred since it provides maximum heat absorption from the solar rays.

Inasmuch as the channel 10 is substantially level throughout its length the water in the chamber 24 will only flow by the height of the head or by water back of it pushing it forward, it being understood, of course, that the water will enter at one end of the channel and pass to the opposite end thereof, where there may be any suitable well-known equipment, indicated generally at 25, for evaporating and condensing the water being treated or processed so as to convert it into fresh water.

There should be sufficient head of water to maintain about ¼" thereof between the plastic sheets 22 and 26 so that there will be a slow flow of the water in a thin film through the passage 24.

Spaced above the portion of sheet 26 in the channel 10 there is a sheet of clear, transparent glass 30, or other suitable rigid transparent material, that will permit the sun's rays to pass therethrough. The edges of the sheet 30 rest on the portions of the plastic sheets that rest on side shoulders 16 at the bottom of the widened top part of the channel 10. The space between the plastic sheet 26 and the glass 30 provides a minimum dead air space 34 which substantially eliminates heat losses by convection air currents over the sheet 26.

It is important to note that the flat black plastic sheet 26 is in direct contact with the body of water 28 within the passage 24, for by this arrangement, coupled with the air space 34 thereabove, which prevents heat losses by convection, maximum transfer of heat from the sun's rays to the water is obtained resulting in rapid heating of the water to a relatively high temperature, preparatory to evaporation and condensation to convert the salt water into fresh water. The other elements of the apparatus prevent substantial loss of heat from the body of water into the ground.

In the apparatus of FIG. 2, there are also means for draining away rain water or water used to wash the upper surface of the glass 30, which comprises drain holes 31 or the like leading from the edges of the glass into the ground.

The form of my invention shown in FIG. 3 is an alternative of the apparatus shown in FIG. 2, and in which there is a film of plastic 40 disposed between the film 22 and the film 26. The space between the plastic sheets 22 and 40 provides a passage 42 beneath the passage 24. Concentrated salt water not converted to fresh water in evaporating equipment 25 passes back to the sea through passage 42 in exchange with sea water flowing through passage 24 toward equipment 25.

Although I have herein shown and described two forms of solar water heating apparatus, each embodying my invention, it is to be understood that various changes and modifications may be made therein without departing from the spirit of the invention and the spirit and scope of the appended claims.

What I claim is:

1. In solar water heating apparatus: an elongated wide shallow channel, insulating material covering the bottom of said channel, a film of flexible, fluid impervious material covering said insulated material, a second film of material spaced upwardly of said first mentioned film to provide a passageway for hot water heated by prior heat exchange with solar energy, a sheet of flexible dull black material spaced upwardly from the second mentioned film to provide a passageway for water to be heated and flowing in counterflow to water in said first mentioned passageway, said sheet of dull black material resting on the surface of said water, and a sheet of clear glass supported above said black sheet of material and in spaced relationship thereto to provide a dead air space between said black sheet and said glass, and each of said passageways having independent ports at their opposite ends including an inlet port for the respective passages at the opposite ends of said water heating apparatus.

2. That method of processing a long, wide, shallow flowing stream of water which comprises forming an open-topped elongated wide shallow channel in substantially level ground, covering the surface of said channel with an impervious film, conveying a substantially continuously flowing shallow layer of water to be processed along said channel while subjecting the same to solar heat through a stationary thin impervious film of flexible sheet material floatingly supported directly on said shallow layer of water to heat the water, and interposing a thin layer of confined captive quiescent air between said water-supported film of sheet material and the surrounding atmosphere to reduce heat losses to the atmosphere.

3. That method defined in claim 2 characterized in interposing a layer of heat insulation between the ground and the undersurface of said first-mentioned impervious film to minimize heat losses into the ground.

4. That method defined in claim 2 characterized in that said quiescent layer of air is confined by placing a sheet of impervious transparent material over and in spaced relation to said film-supporting layer of water and substantially sealed thereto along the opposite lateral edges of said channel.

5. That method defined in claim 2 characterized in that said water-supported film of sheet material is dark-colored and possesses excellent heat-absorbing properties.

6. That improvement in heating a flowing stream of water economically between film-like sheet plastic utilizing solar energy which method comprises, forming a very low-head shallow wide elongated channel in and along the ground surface with the upper end of said channel in communication with a source of water to be heated, covering the bottom of the channel with water-proofed heat-insulating material having a flat upper surface, passing a continuously flowing shallow stream of water from said supply source along said heat-insulated channel while floatingly supporting thereon a thin impervious film of heat-absorbing material sealed to the opposite lateral edges of said channel, exposing said film-covered stream of water to solar heat through a thin captive layer of air, and continuously withdrawing heated water from the downstream end of said channel.

7. That improvement defined in claim 6 characterized in interposing an additional film of impervious sheet material between said heat insulation and the aforesaid water-supported film, and passing separate layers of water in opposite directions along said channel and in contact with the opposite surfaces of said additional film of impervious material, the water in the lower one of said layers being relatively hot as it enters, whereby heat present therein is transferred by conduction to the overlying upper layer to heat the same from below while said upper layer is being heated simultaneously by solar energy.

8. That method of preheating sea water preparatory to the distillation thereof which method comprises, forming a long wide shallow channel in and along substantially level ground with only a slight change in elevation therealong, water-proofing the bottom of said channel with poor heat-conducting material having a flat upper surface directly exposed to solar energy, and flowing a thin layer of sea water along said flat surface by gravity action, floating a thin film of impervious sheet material on the surface of said thin water layer to separate the same from atmospheric air while maintaining the edges of said film sealed to the opposite lateral edges of said channel.

9. That method defined in claim 8 characterized in supporting sheet transparent material in closely spaced parallel relation to said water-supported film and utilizing the same to confine a layer of quiescent air therebelow to minimize heat losses to the overlying atmospheric air.

10. That method defined in claim 8 characterized in dividing said flowing shallow stream of sea water into an upper and a lower parallel stream, and passing said upper and lower streams in counterflow heat-exchange relation to one another and having interposed therebetween a horizontally disposed thin sheet of impervious material having its opposite lateral edges supported along the opposite lateral edges of said channel and arranged to prevent the transfer of water between said divided streams along the edges thereof.

11. That method of heating sea water utilizing solar energy which comprises, forming a long shallow wide substantially level flow channel in the ground, heat-insulating the bottom of the channel, flowing a shallow stream of sea water by gravity action along said channel layer, a film of heat-absorbent plastic sheet material across said channel with the opposite edges overlapping the edges of the channel and the intervening portion in contact with and buoyantly supported by said flowing stream of water, and holding the lateral edges of said plastic film sealing against either side of the channel by an overlying sheet of rigid transparent material effective in cooperation with said plastic film to hold a shallow layer of air captive immediately above said film-covered stream of sea water to minimize heat losses to the ambient atmospheric air.

12. Sea water conversion apparatus adapted to utilize solar energy in preheating sea water flowing toward salt and water separating equipment and for recovering waste heat from hot liquid discharging from said separating equipment; said apparatus comprising a long wide shallow channel having its inlet end in communication with a source of sea water to be converted to fresh water, impervious film-like sheet material spanning said channel and cooperating therewith to provide at least a pair of superimposed enclosed flow channels parallel to the bottom of said channel, salt separating equipment at the end of said channel remote from said sea water source, the upper one of said flow channels being adapted to be filled with a shallow stream of sea water undergoing heating by solar energy and impinging against the lower surface of the upper one of said sheets and buoyantly supporting the same, and the lower one of said flow channels being adapted to be filled with waste hot fluid discharging from said separating equipment and flowing toward said source of sea water in heat exchange with the inflowing stream of sea water.

13. Solar water heating apparatus comprising: means defining a long wide channel extending along and formed in the ground and having a substantially level bottom provided with an inlet for sea water at its upper end and an outlet for heated water at its lower end, a relatively thick sheet of heat-insulating material supported on the bottom of said channel, a first sheet of plastic material covering said insulating material with its opposite lateral edges extending upwardly and outwardly over the channel edges, a second film-like sheet of plastic material spaced upwardly from said first sheet and supported directly on a stream of sea water flowing along said channel while undergoing heating by solar energy, said second sheet of plastic having high heat-absorbing properties with its opposite lateral edges extending upwardly and outwardly over the edges of said channel and in direct contact with the juxtaposed edges of said first sheet, and means including a sheet of rigid transparent material overlying said channel and spaced from said sheet of plastic to provide a closed dead air space therebetween.

14. Solar water heating apparatus for use in the conversion of sea water to fresh water comprising means defining a long shallow channel along the ground with a substantially level bottom and with side walls and including an inlet at one end for sea water, a relatively thick sheet of insulating material covering the bottom of the channel, a first sheet of plastic material covering said insulating material, a second sheet plastic material in contact with the edges of said channel and spaced upwardly from said insulating material and cooperating with said first sheet of plastic material to form a passageway for the flow of water, a third sheet of plastic spaced upwardly from said second sheet of plastic material to provide a passageway for sea water to be heated by solar energy and by heat exchange with previously heated sea water flowing in the opposite direction in the space between said first and second sheets of plastic, and means interconnecting one pair of adjacent ends of said passageways for directing water discharging from one passage and returning it to the inlet end of the other passage for return flow therethrough in counterflow to the stream in said one passage.

15. That method of treating mass quantities of brackish waters to convert the water to fresh water inexpensively by utilizing solar energy to preheat the raw water undergoing processing and without need for apparatus or structural supports other than impervious films to confine the water being subjected to solar heat, said method comprising utilizing the earth's surface adjacent the source of salty water to be converted into fresh water to support the water during heating by forming a shallow wide long channel along the ground having its inlet end connected to the source of salty water supply, passing a substantially continuously flowing stream of the water along said channel to a depth of appreciably less than one inch while confining said water between an upper and a lower pair of parallel films of impervious flexible material with the upper film buoyantly supported on the surface of the flowing stream to exclude air, said channel being sufficiently long that the flowing stream of water is heated by solar energy to a temperature approaching a maximum practical value achievable directly by solar energy by the time flowing water reaches the outlet end of said channel, and withdrawing the solar-heated salty water and thereupon treating the same to separate the water from its salty constituents.

References Cited in the file of this patent

UNITED STATES PATENTS

| | | |
|---|---|---|
| 1,250,260 | Wilcox | Dec. 18, 1917 |
| 1,473,018 | Danner | Nov. 6, 1923 |
| 1,889,238 | Clark | Nov. 29, 1932 |
| 2,427,262 | Delano | Sept. 9, 1947 |
| 2,580,555 | Kroeger | Jan. 1, 1952 |

FOREIGN PATENTS

| | | |
|---|---|---|
| 763,867 | France | May 8, 1934 |
| 840,926 | France | Jan. 28, 1939 |
| 994,106 | France | Nov. 12, 1951 |